(12) United States Patent
Couto (10) Patent No.: US 10,098,315 B2
(45) Date of Patent: Oct. 16, 2018

(54) CYLINDRICAL SYSTEM FOR ANIMAL EXCREMENT REMOVAL WITH REMOVABLE LITTER TRAY

(71) Applicant: Dúnio Couto, Angra do Heroísmo (PT)

(72) Inventor: Dúnio Couto, Angra do Heroísmo (PT)

( * ) Notice: Subject to any disclaimer, the term of this patent is extended or adjusted under 35 U.S.C. 154(b) by 0 days.

(21) Appl. No.: 15/822,786

(22) Filed: Nov. 27, 2017

(65) Prior Publication Data
US 2018/0077896 A1    Mar. 22, 2018

Related U.S. Application Data

(63) Continuation-in-part of application No. PCT/PT2016/050009, filed on May 14, 2016.

(30) Foreign Application Priority Data

May 27, 2015    (PT) .......................... 108503

(51) Int. Cl.
*A01K 29/00*    (2006.01)
*A01K 1/01*     (2006.01)

(52) U.S. Cl.
CPC ................. *A01K 1/0114* (2013.01)

(58) Field of Classification Search
CPC .... A01K 1/011; A01K 1/0114; A01K 1/0107; A01K 1/01
USPC ........ 119/166, 165, 168, 161, 170, 167, 163
See application file for complete search history.

(56) References Cited

U.S. PATENT DOCUMENTS

| | | | | |
|---|---|---|---|---|
| 4,120,264 A | * | 10/1978 | Carter ................. | A01K 1/0114 119/166 |
| 4,846,104 A | * | 7/1989 | Pierson, Jr. ......... | A01K 1/0114 119/166 |
| 5,107,797 A | * | 4/1992 | LaRoche ............. | A01K 1/0114 119/163 |
| 5,662,066 A | * | 9/1997 | Reitz ................... | A01K 1/0114 119/163 |
| 6,126,015 A | * | 10/2000 | Haymaker .......... | A01K 1/0114 119/166 |

(Continued)

FOREIGN PATENT DOCUMENTS

WO    2013160899 A1    10/2013

OTHER PUBLICATIONS

International Search Report, PCT/PT2016/050009, dated Aug. 1, 2016; dated Sep. 8, 2016, 3 pages.

(Continued)

*Primary Examiner* — Trinh T Nguyen
(74) *Attorney, Agent, or Firm* — The Roy Gross Law Firm, LLC; Roy Gross (57) ABSTRACT

A system for pet excrement removal, separating the excrements from the clean litter by lodging them in a separate compartment from the litter box. To do so, it is only necessary to rotate a cylinder. The system has a removable litter tray where the animal can do its physiological needs. The fact that it is removable allows for an easy sanitation, because it can be removed from the system, with or without litter, which simplifies its washing, increasing the hygiene of the litter box. The removable litter tray, previously mentioned, has a support base for entry and exit of the animal, which allows removal of the litter attached to the animal's paws, when exiting the litter box, in order to keep the surrounding environment clean.

12 Claims, 14 Drawing Sheets

(56) References Cited

U.S. PATENT DOCUMENTS

| | | |
|---|---|---|
| 6,463,881 B1 | 10/2002 | Reitz |
| 8,757,094 B2 * | 6/2014 | Baxter .................. A01K 1/011 119/161 |
| 2002/0139312 A1 * | 10/2002 | Reitz .................... A01K 1/0114 119/165 |
| 2005/0224006 A1 | 10/2005 | Colsky |
| 2007/0227457 A1 * | 10/2007 | Waters ................ A01K 1/0114 119/166 |
| 2008/0017123 A1 * | 1/2008 | Chin ..................... A01K 1/011 119/166 |
| 2011/0214614 A1 * | 9/2011 | Sharp ................... A01K 29/00 119/166 |
| 2014/0245960 A1 | 9/2014 | Bexter et al. |

OTHER PUBLICATIONS

Written Opinion of the International Searching Authority, PCT/PT2016/050009, dated Sep. 8, 2016, 5 pages.

* cited by examiner

CYLINDRICAL SYSTEM FOR ANIMAL EXCREMENT REMOVAL WITH REMOVABLE LITTER TRAY

CROSS REFERENCE TO RELATED APPLICATIONS

This application is a continuation-in-part of PCT Patent Application No. PCT/PT2016/050009 having International filing date of May 14, 2016, which claims the benefit of priority of Portugal Application No. 108503 filed on May 27, 2015 entitled CYLINDRICAL SYSTEM FOR ANIMAL EXCREMENT REMOVAL WITH REMOVABLE LITTER TRAY. The contents of the above applications are all incorporated by reference as if fully set forth herein in their entirety.

FIELD OF THE INVENTION

This invention is a litter box that does not require manual excavation for excrement cleaning, which reduces human exposure to feces and bad odors.

Concomitantly it reduces the accumulation of litter in the surroundings, either from the litter that may attach itself to the animal's paws when exiting the removable litter tray by the animal passing through the grid of the base holder or from the litter the animal may spill when excavating.

It possesses a removable litter tray that may be removed from the system, with or without litter, allowing its sanitation and thus increasing its hygiene.

BACKGROUND OF THE INVENTION

In recent years, all over the world, cats have become the most popular indoor pets.

Unlike the dog, which needs to go outside several times a day to do its physiological needs, the cat can stay indoors permanently, utilizing the litter box as a toilet. For this reason, litter boxes have become a common feature in many homes, in many countries.

Throughout the years several litter boxes have been invented, from the simplest to the so called "advanced". The simplest ones require manual excrement removal, by digging in the litter to look for these. The simple, but advanced, do not require manual excavation of the excrements, however they are not automated. In the so called "advanced", the process is automated and requires little from the human.

These inventions, however, do not solve the several problems pet owners face, like regular sanitation of the litter tray, the litter spread around the litter box area and the manual excavation for excrements, they are limited to solving one or two problems per invention.

For instance U.S. Pat. No. 4,120,264A, is limited to removing the excrements without direct manual process, however it does not solve the problem of the litter that falls from the animal's paws to the surrounding environment after it uses the litter box.

The U.S. Pat. No. 5,662,066, US20140245960 and U.S. Pat. No. 6,463,881, also do not solve the problem of the litter that gets stuck in the animal's paws and spreads to the surrounding environment. They are basically limited to solving the problem of direct manual removal of the excrements, in an automatic and automated way.

Other solutions have been developed, for instance patent WO2013160899, which solves two problems, easy removal of the excrements, without direct intervention and the litter that attaches to the animal's paws. It is not, however, practical when it comes to the regular sanitation necessary to a litter box, due to the residues of animal urine that tend to lodge in the bottom of the tray of the litter box. In order to sanitize the box it is necessary to remove the litter from the system to another location and to move the entire system to the washing place.

Throughout the new inventions, the sanitation of the litter box tray has been one of the forgotten factors, concerning hygiene matters, which is, possibly, one of the biggest problems a pet owner has to deal with.

Concerning the animal's urine, it tends to lodge in the bottom of the litter tray. No matter how much litter you add to the tray, the animal tends to excavate leaving the excrements always near the bottom of the litter tray. It is practically inevitable that this happens and when it happens constantly, the granular matter ("cat litter") tends to get stuck to the bottom of the tray.

In systems where the removal of the animal's excrements is done manually and directly, pet owners usually move the litter to one side of the tray and scrape the paste, resultant of the contact of the urine with the granular matter and the bottom of the tray, with a scoop, throw it away and re-cover with litter without washing first.

In other systems, as the ones mentioned earlier, especially the automated ones, where interior access is limited, the paste is not even scraped, clean litter is placed on top, which, in matters of hygiene, is far from desired.

Having into account these considerations, it is highly relevant the creation of a litter box where manual excavation for excrement removal is not necessary, that avoids or diminishes the litter attached to the animal's paws, which culminates in a better cleanliness of the surrounding environment and possesses a removable litter tray, with or without litter, in order to facilitate regular sanitation, without litter to make washing the removable litter tray easier, and with litter to make the rest of the system easier to wash without the need to move it to another location.

The patent application US005107797A discloses a removable drawer (60), but this cited removable drawer (60) does not solve the technical problem in an easy and expeditious manner as claimed in the present invention.

The cited patent application US005107797A as referred in line 66 of the page 2 "The rotatable enclosure 5 is filled to an appropriate depth with litter material, which can rest either upon the inner surface of the enclosure 5, or upon a removable drawer 60 (see FIGS. 9-14) which itself rests upon the inner surface of the enclosure 5".

Figure 14:
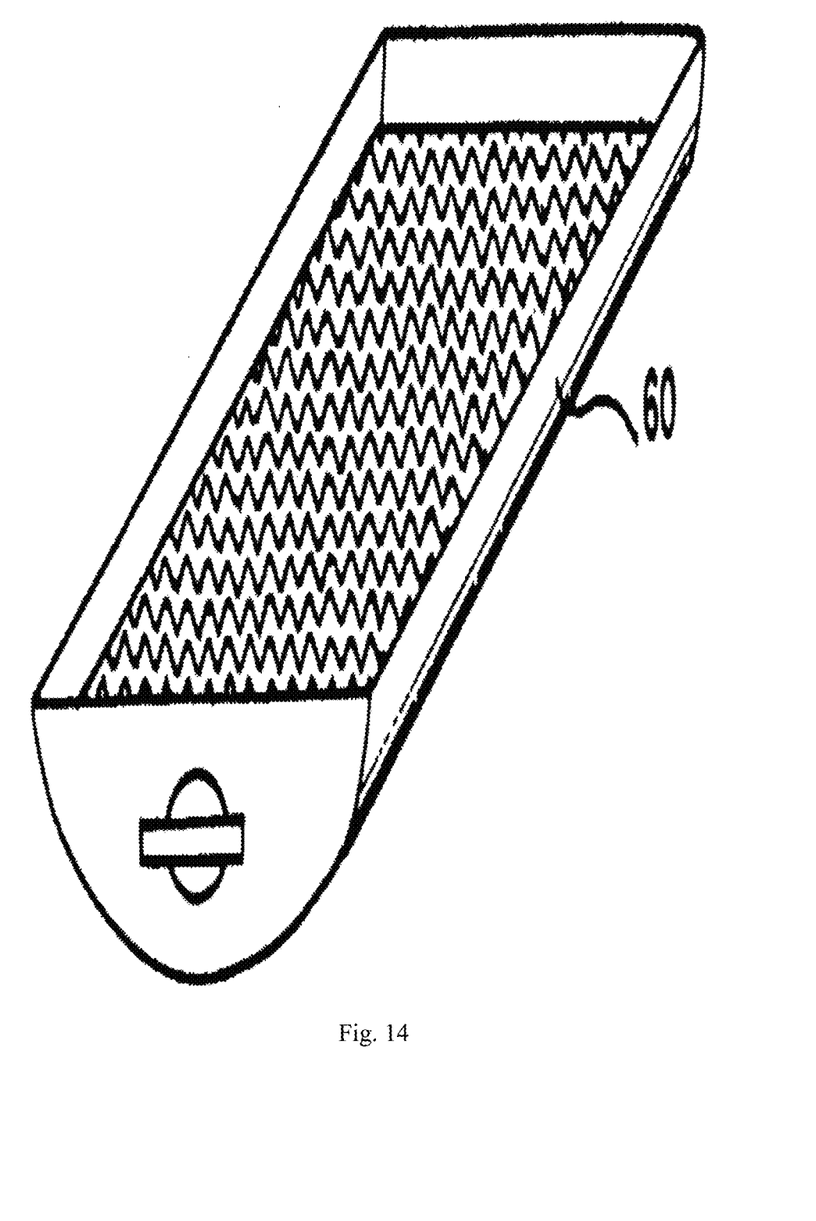

The above mention removable drawer 60, which is only mentioned in the brief description of the drawings and in the cited paragraph of the description, is only shown in FIG. 10 (see FIG. 14) separately from the rotatable enclosure 5 and the removable drawer 60 is not shown in any of FIGS. 1, 3, 4, 5 and 8 that shown the rotatable enclosure 5.

In any FIGS. 1, 3, 4 and 8 the removable drawer 60 is never represented inside of the rotational housing 5.

Figure 10:
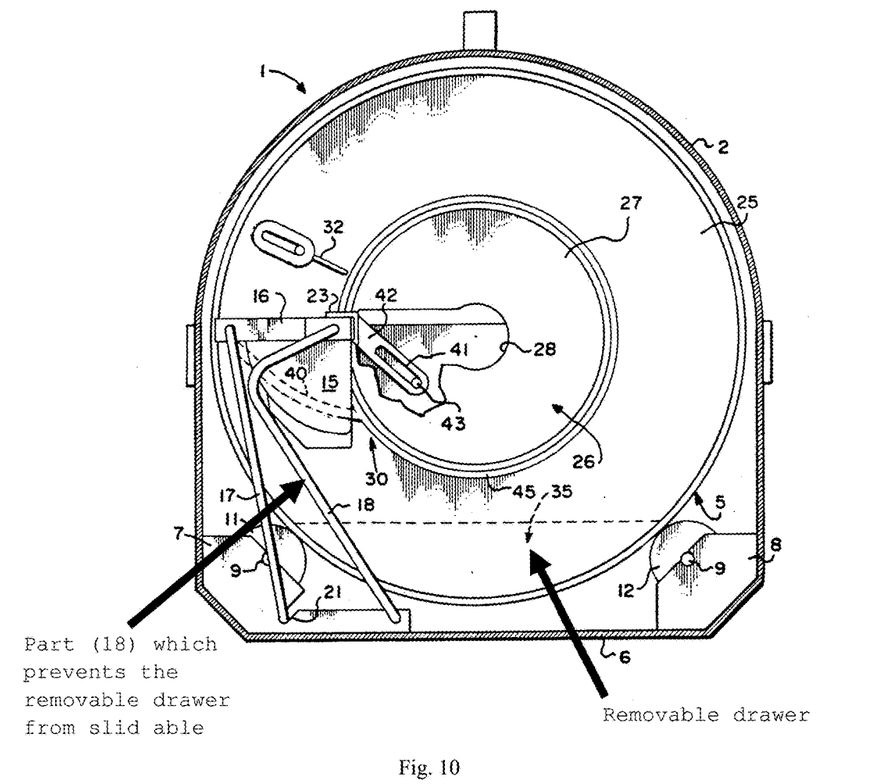
Figure 11:
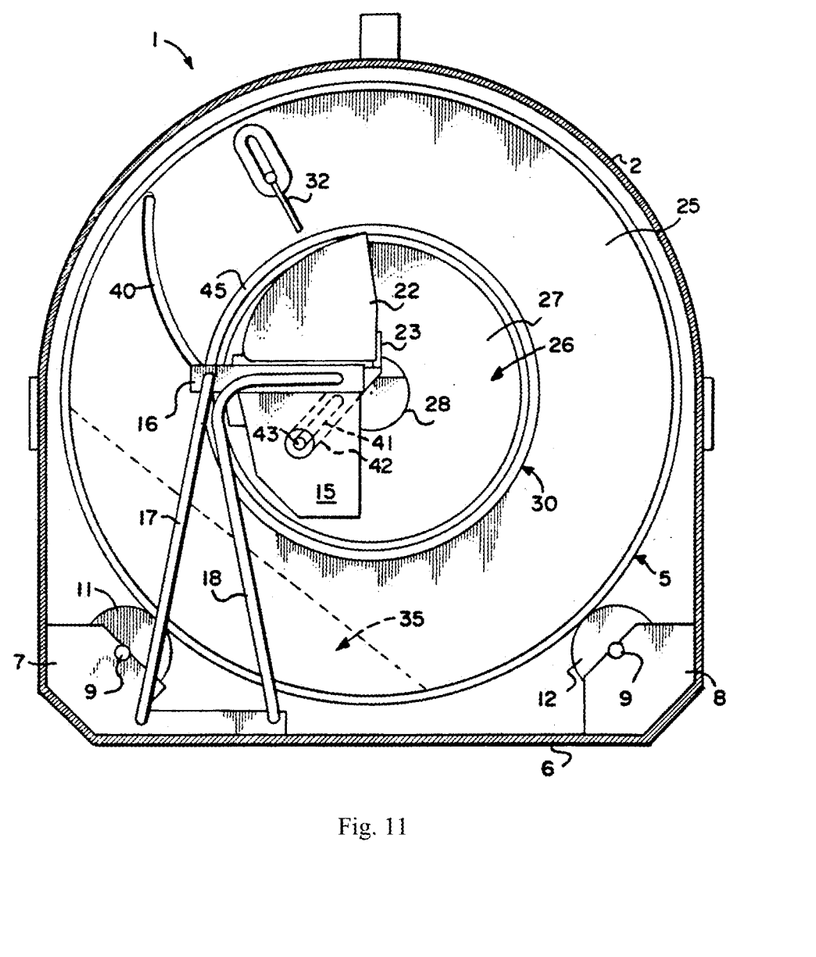
Figure 12:
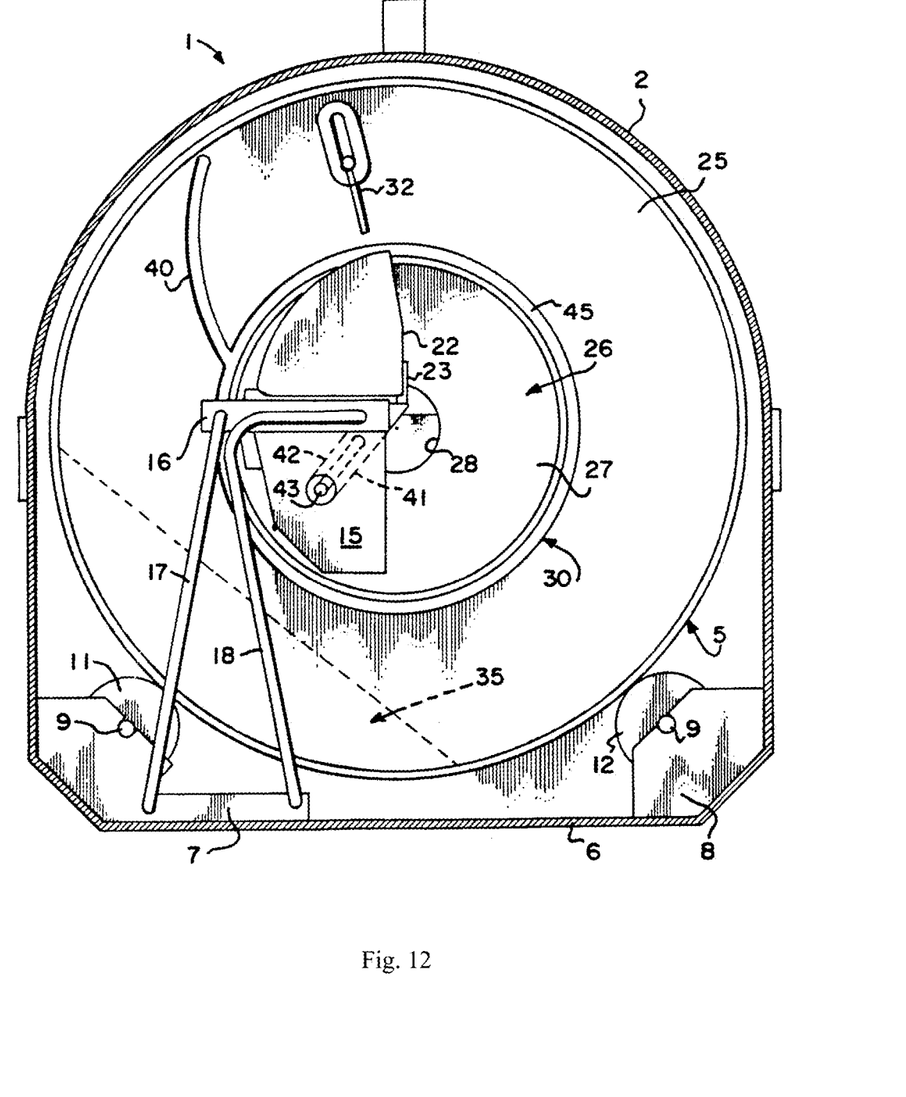
Figure 13:
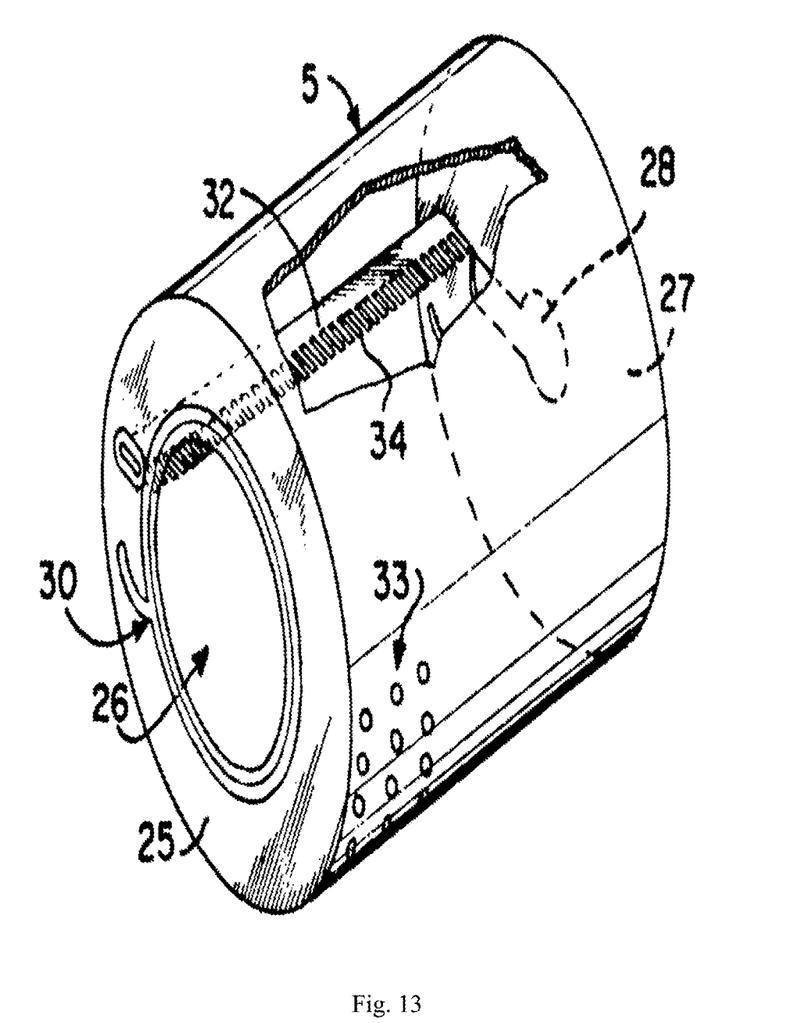

But in anyway if this removable drawer 60 is located inside of the housing 5 in the region of the litter 35 shown with a dashed line, FIGS. 3, 4 and 5 (see FIGS. 3-5), it does not solve the technical problem that the present invention is solved, because the supports 17, 18 (which are between the cylinder 5 and the housing 2) and also end 3 of the housing 2, block the removable drawer 60 to come out from the inside of the housing 5 in a horizontal and slid able manner. So the removable drawer 60 couldn't come out from the inside of the housing 5 in an easy and expeditious manner as claimed in the present invention.

SUMMARY OF THE INVENTION

Accordingly, it is an object of the invention to provide an advanced system for excrement removal.

These and other objects of the present invention are achieved by providing acylindrical system for animal excrement removal comprising: a rotating cylinder comprising: an internal chamber, a filtration grid inside the rotating cylinder, and an opening along its side and an opening for animal entry and exit; a removable litter tray; and an excrement collection drawer.

In certain embodiments, the rotating cylinder further comprises an opening for insertion and removal of the of the removable litter tray.

In certain embodiments, the removable litter tray has a support base.

In certain embodiments, the support base includes a grid.

In certain embodiments, the system includes a base structure that supports the cylindrical system.

In certain embodiments, the excrement collection drawer is in the basic structure.

In certain embodiments, the cylindrical system rotates, and the rotation may be initiated manually of via an engine.

In certain embodiments, the system blocks the cylinders rotation, in the position for animal use and in the excrement discharge position.

In certain embodiments, the system is characterized by its filtration grids, in the chamber (and in the removable litter trays' support base), being variable in their shape, size and sifting measurements.

In certain embodiments, the base structure is variable in its shape and size.

In certain embodiments, wherein the rotating cylinder is variable in its size.

In certain embodiments, wherein the system is produced in any type of material.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 9—FIG. 1 of the state of the art concerning the patent application US005107797A.

FIG. 10—FIG. 3 of the state of the art concerning the patent application US005107797A.

FIG. 11—FIG. 4 of the state of the art concerning the patent application US005107797A.

FIG. 12—FIG. 5 of the state of the art concerning the patent application US005107797A.

FIG. 13—FIG. 8 of the state of the art concerning the patent application US005107797A.

FIG. 14—FIG. 10 of the state of the art concerning the patent application US005107797A.

DETAILED DESCRIPTION OF THE INVENTION

Figure Description

1. Basic Structure
2. Rotating Cylinder
   2.1. Chamber
   2.2. Chamber Filtration Grid
   2.3. Rotating cylinder lateral opening
   2.4. Opening for insertion and removal of removable drawer
   2.5. Opening for animal entry and exit
3. Removable litter tray
4. Excrement collection drawer
5. Latch
6. Support Base
7. Support Base Grid
8. Excrements
9. Granular matter
A. Operating position
B. Discharge Position
C. Granular matter leveling position The following invention is comprised of the following:

A basic structure (1) and a rotating cylinder (2). The basic structure (1) is the support for the whole system, the rotating cylinder (2) is embedded inside it.

The inferior part of the basic structure (1) has an excrement collection drawer (4) and the superior part has a cover for the rotating cylinder. This cover for the rotating cylinder has the function of preventing the litter to exit to the surrounding area through the lateral opening (2.3) of the rotating cylinder (2) while the animal excavates in the litter.

The rotating cylinder (2) is the litter cleansing mechanism. There is an opening (2.3) along the side of the rotating cylinder (2), through which the excrements exit and are directed to the excrement collection drawer (4). There is an opening in the frontal part of the rotating cylinder for the animal's entry and exit (2.5). There is also an opening for the insertion and removal of the removable litter tray (2.4).

In the rotating cylinder's interior (2) there is a chamber (2.1), which is open on one of the sides to the interior of the cylinder through a filtration grid (2.2). The chamber's function (2.1) is to keep the clean litter during the process of excrement removal. The filtration grid's function (2.2) is to only allow the litter with inferior size to its grid to pass to the interior of the chamber, leaving outside of the chamber (2.1) everything that is larger.

In the rotating cylinder (2) is inserted a removable litter tray (3), where the granular matter is placed and where the animal places its excrements (8). The removable litter tray (3), has a support base (6) in its exterior, which acts as a support for the entry and exit of the animal in the removable litter tray (3). This support base (6) is directly connected to the interior of the removable litter tray (3). In the superior part of the support base (6) is a grid (7) for cleaning the litter stuck in the paws of the animal, as the animal exits the removable litter tray (3) it places its paws on the grid (7) over the support base (6) causing the litter stuck in the paws to pass through the grid (7) and make its way back to the removable litter tray (3). The support grid (6) also functions as a handle for the removable litter tray (3).

After the removable litter tray (3) is embedded in the rotating cylinder (2), with the granular matter and the rotating cylinder (2) in embedded in the basic structure (1), the System is ready to use.

Figure 1:
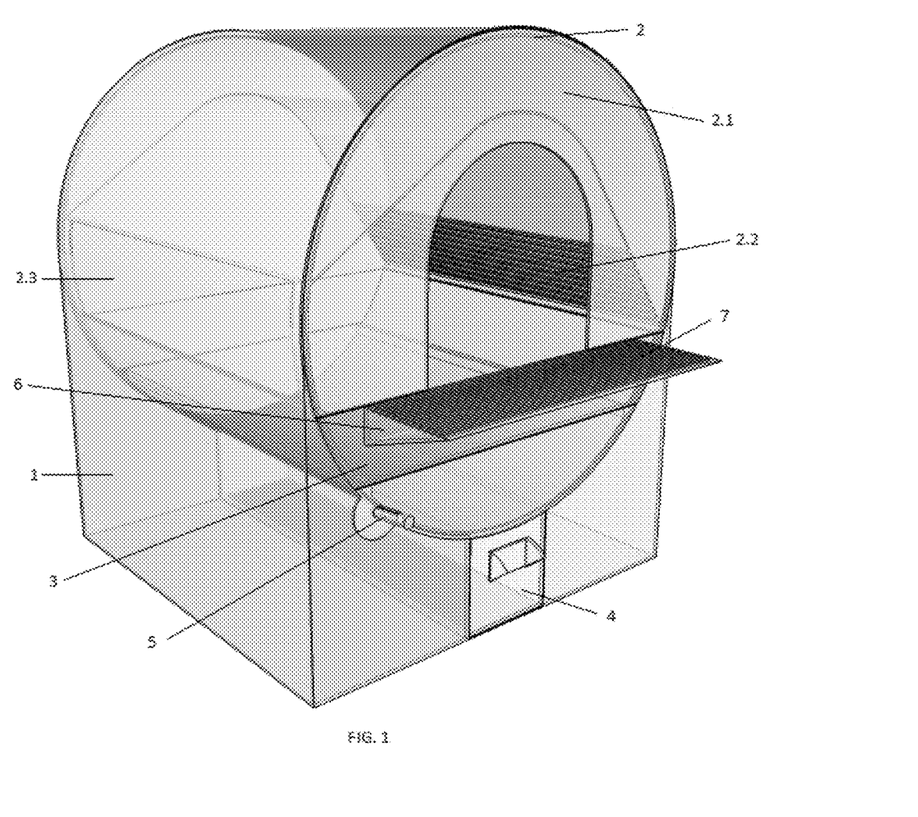
FIG. 1—Cylindrical system for animal excrement removal with removable litter Tray in X-ray vision.
Figure 2:
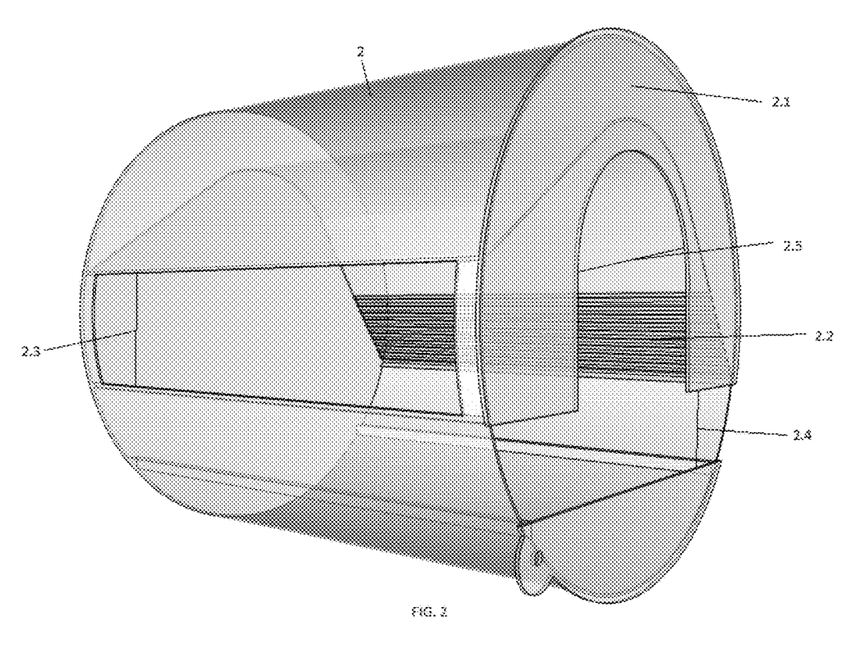
FIG. 2—Composition of rotating cylinder.
Figure 3:
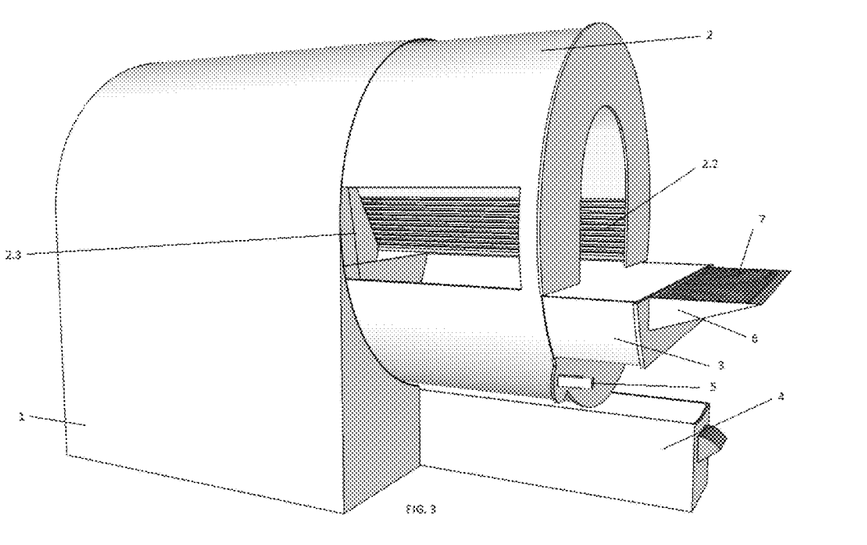
FIG. 3—Cylindrical system for animal excrement removal with removable litter Tray, with view of how the parts assemble.
Figure 4:
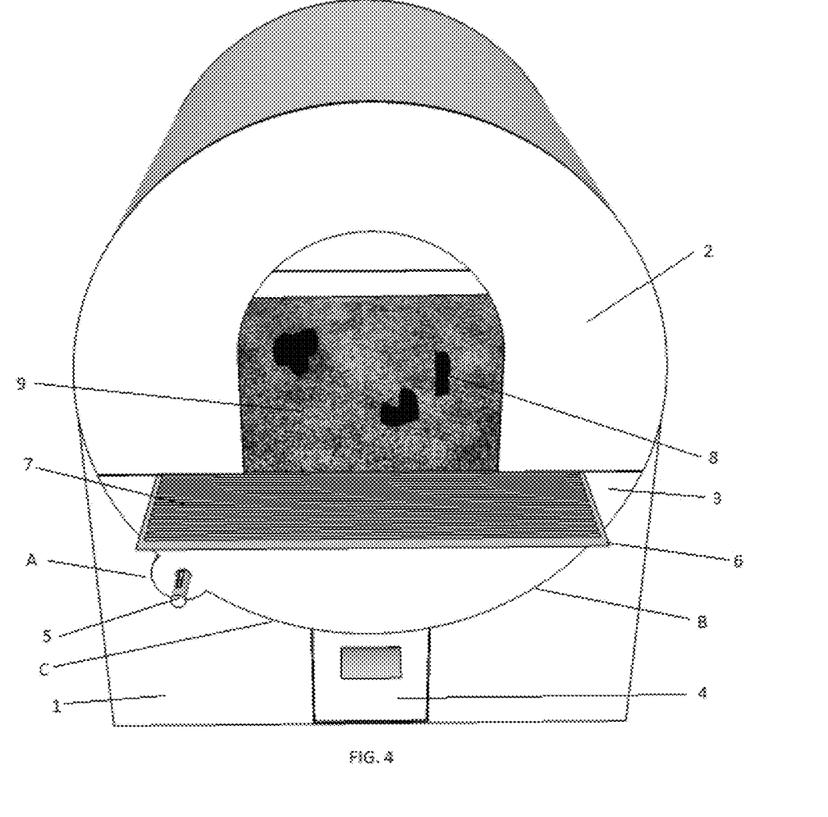
FIG. 4—Cylindrical system for animal excrement removal with removable litter Tray in operating position and with excrements in removable tray.
Figure 5:
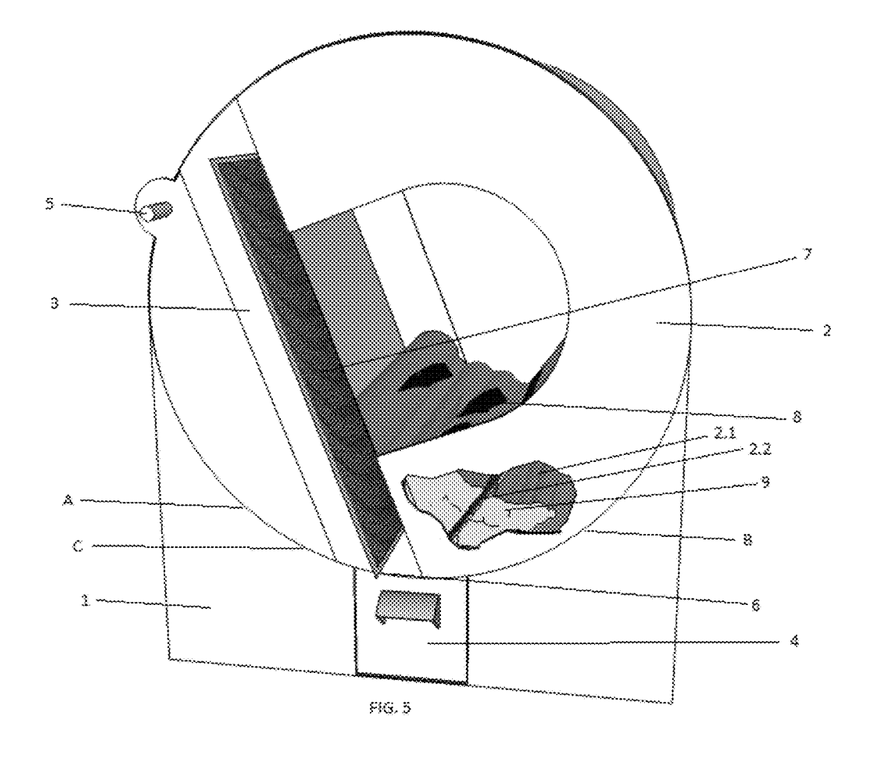
FIG. 5—Cylindrical system for animal excrement removal with removable litter Tray, stage where granular matter exits from removable tray and passes through the filtration grid, causing the finer matter to pass to the interior of the chamber, (partial cut of the front end of the rotating cylinder allowing visualization of the interior).
Figure 6:
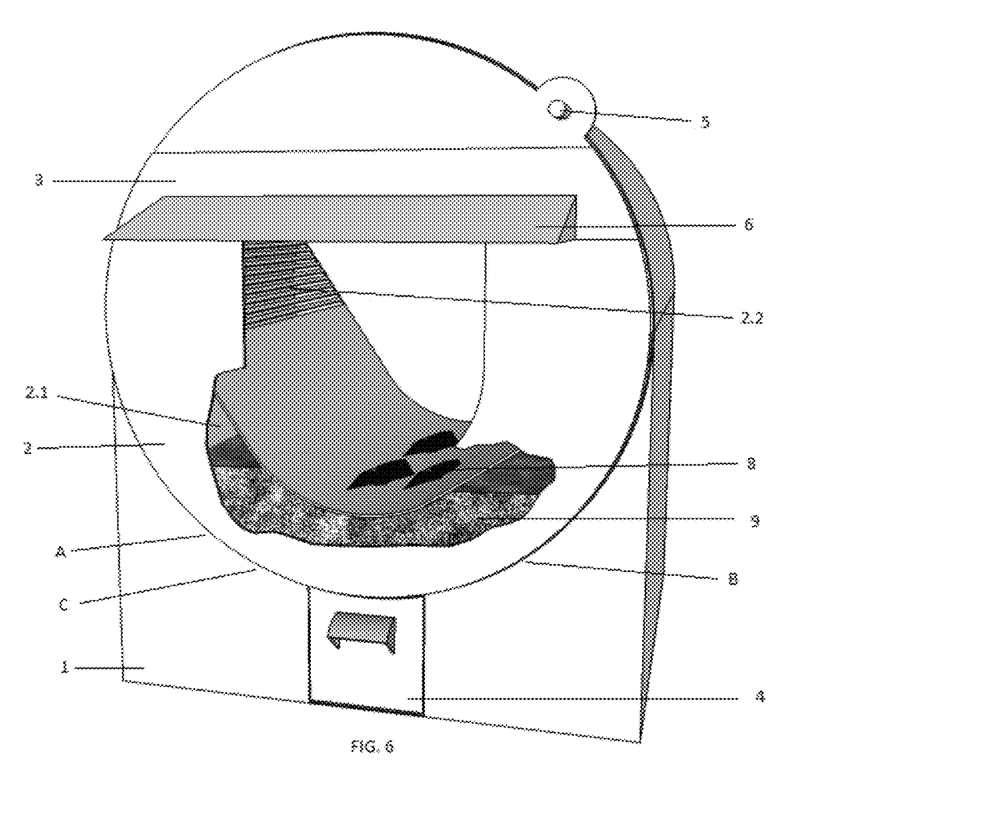
FIG. 6—Cylindrical system for animal excrement removal with removable litter Tray, stage when the clean granular matter is inside the chamber and the excrements are outside, (partial cut of the front end of the rotating cylinder allowing visualization of the interior).

To proceed to the removal of the excrements (9), one holds the latch (5), unlocking it (locking system to the cylinders rotation) from position A (use position) and spins the rotating cylinder (2) (clockwise according to the figure sequence of figures FIG. 4 FIG. 5 FIG. 6 FIG. 7), over its generally horizontal axle, toward position B (excrement discharge position). During this rotation the litter goes out of the removable litter tray (3) by gravity and as it exits, it passes through the filtration grid (2.2) (FIG. 5), causing the clean litter (smaller matter) to pass to the interior of the chamber of the rotating cylinder (2), while the clusters (larger matter, residue, clusters of urine and litter, droppings) remain inside the cylinder (FIG. 6).

Figure 7:
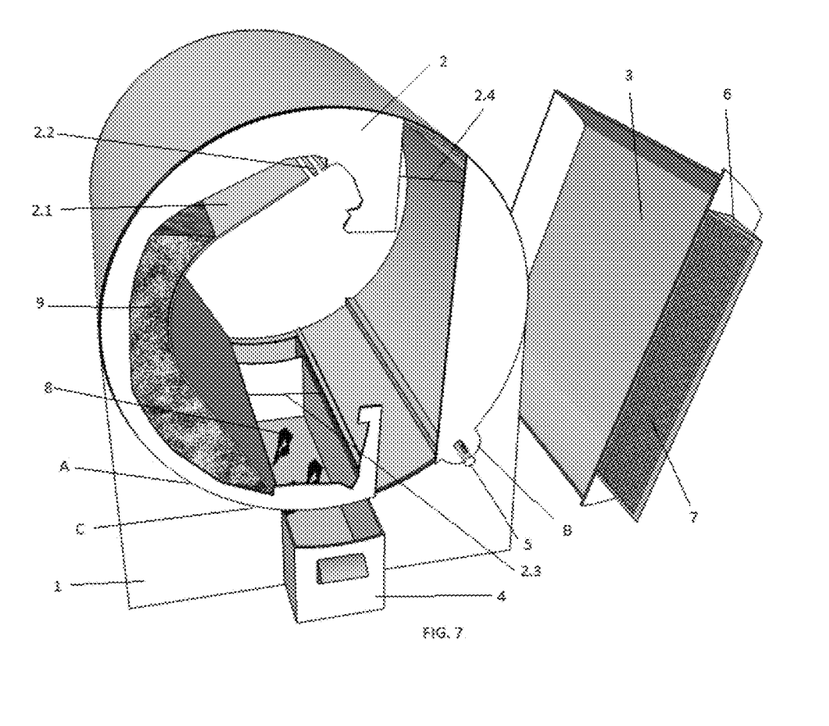
FIG. 7—Cylindrical system for animal excrement removal with removable litter Tray, unloading position stage, when the excrements are moved to the excrement removable drawer, the clean litter is inside the chamber and when the tray without litter can be removed, (partial cut of the front end of the rotating cylinder allowing visualization of the interior).

As the lateral opening on the rotating cylinder (2.3) reaches the inferior part of the cylinder, the clusters fall inside the excrement collection drawer (4) by gravity. When the latch (5) reaches point B, the system locks indicating that the discharge was made (FIG. 7).

Figure 8:
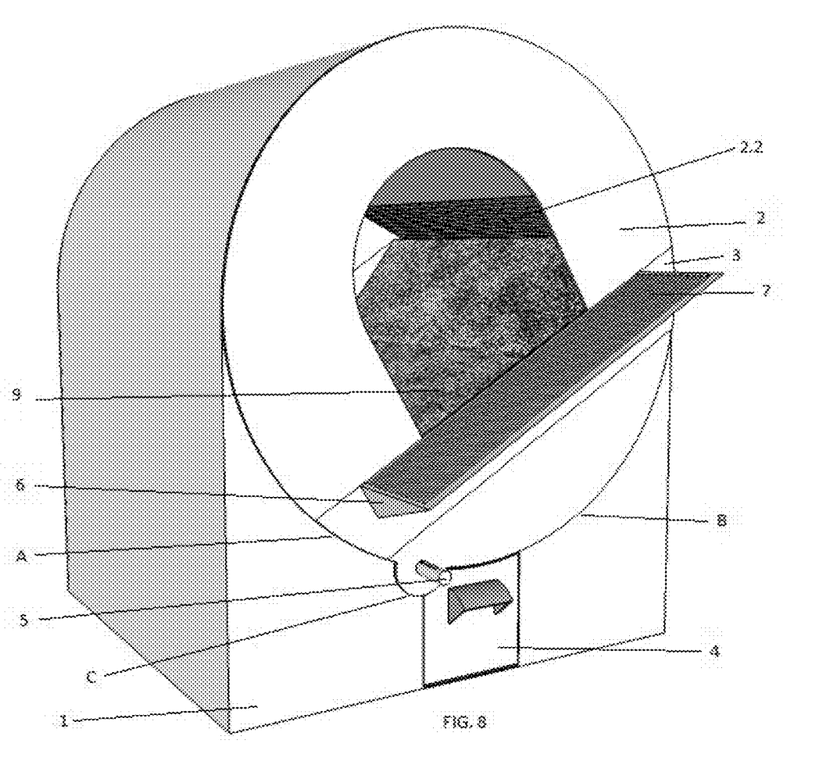
FIG. 8—Cylindrical system for animal excrement removal with removable litter Tray, on litter leveling position inside the litter tray.
Figure 9:
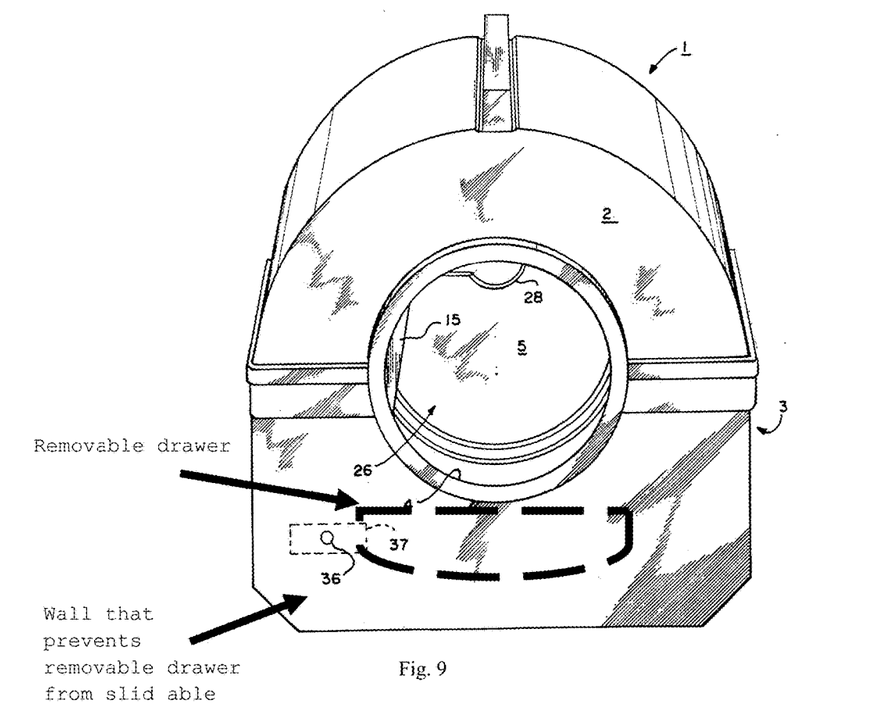

After the discharge is done, with the latch (5), locked on point B, the empty removable litter tray (3) can be removed from the system, because the clean litter is inside the chamber (2.1). At this stage, the removable litter tray (3) can be washed in a simple and practical manner. After reinserting the removable litter tray (3) in the system, the latch (5) is unlocked from point B and inverse rotation is done toward point C (granular matter leveling position (9) of the removable litter tray (3)). During the inverse rotation, the clean litter follows the inverse route, exits the chamber (2.1) passing through the filtration grid (2.2) and returns to the removable litter tray (3). When it reaches point C the inclination of the removable litter tray (3) (FIG. 8) makes the granular matter be leveled inside the removable litter tray (3) (FIG. 6). Then, one inverts the direction of rotation, once more, to point A, where the latch (5) locks the system with removable litter tray (3) in the horizontal position and the system is ready to be used again.

The latch (5) prevents the rotating cylinder from spinning when the animal is using the removable litter tray (3) and prevents the rotation when it is necessary to remove the removable litter tray (3) from the system, once the excrement discharge (9) has been done into the excrement collection drawer (4).

The rotation of the rotating cylinder (2) can be done manually or resorting to an engine. The whole system can be produced in any type of material and with no size limitation. The filtration grid in the inside chamber (2.2) and the grid in the support base (7) are variable in their shape and sifting size. The basic structure (1) is variable in its shape.

Accordingly, this invention is not to be limited by the embodiments as described, since these are given by way of example only and not by way of limitation.

Having thus described several embodiments for practicing the inventive method, its advantages and objectives can be easily understood. Variations from the description above may and can be made by one skilled in the art without departing from the scope of the invention, which is to be determined from and by the following claims.

The invention claimed is:

1. A cylindrical system for animal excrement removal comprising:
   a rotating cylinder comprising:
      an internal chamber,
      a filtration grid inside the rotating cylinder,
      an opening along a side of the rotating cylinder, and
      an opening for animal entry and exit at the frontal part of the rotating cylinder;
   a removable litter tray; and
   an excrement collection drawer,
   wherein animal excrement is configured to exit from the opening along the side of the rotating cylinder into the excrement collection drawer, and
   wherein litter is configured to pass through the filtration grid inside the rotating cylinder into the removable litter tray.

2. The cylindrical system of claim 1, wherein the rotating cylinder further comprises an opening for insertion and removal of the of the removable litter tray.

3. The cylindrical system of claim 2, wherein the removable litter tray has a support base.

4. The cylindrical system of claim 3, wherein the support base includes a filtration grid.

5. The cylindrical system of claim 1, further comprising a base structure that supports the cylindrical system.

6. The cylindrical system of claim 5, wherein the excrement collection drawer is located in the base structure.

7. The cylindrical system of claim 1, wherein the cylindrical system rotates, and the rotation may be initiated manually of via an engine.

8. The cylindrical system of claim 1, wherein the system blocks the cylinders rotation, in the position for animal use and in the excrement discharge position.

9. The cylindrical system of claim 4, wherein the filtration grid inside the rotating chamber and in the removable litter tray support base are variable in their shape, size and sifting measurements.

10. The cylindrical system of claim 1, wherein the base structure is variable in its shape and size.

11. The cylindrical system of claim 1, wherein the rotating cylinder is variable in its size.

12. The cylindrical system of claim 1, wherein the system is produced in any type of material.

* * * * *